(12) United States Patent
Rogitz

(10) Patent No.: US 8,554,253 B2
(45) Date of Patent: Oct. 8, 2013

(54) TELEPHONE MESSAGING PRIVACY

(75) Inventor: John L. Rogitz, San Diego, CA (US)

(73) Assignee: John L. Rogitz, San Diego, CA (US)

( * ) Notice: Subject to any disclaimer, the term of this patent is extended or adjusted under 35 U.S.C. 154(b) by 428 days.

(21) Appl. No.: 12/869,339

(22) Filed: Aug. 26, 2010

(65) Prior Publication Data

US 2012/0052886 A1　Mar. 1, 2012

(51) Int. Cl.
*H04W 4/00* (2009.01)
(52) U.S. Cl.
USPC .......................................... 455/466; 455/418
(58) Field of Classification Search
USPC .............. 455/466, 418, 416, 3.06, 3.05, 3.03, 455/412.1, 415, 414.1, 422.1, 411; 726/26; 701/210, 209; 715/500, 530; 379/158, 379/202.01; 340/995.19
See application file for complete search history.

(56) References Cited

U.S. PATENT DOCUMENTS

| | | | |
|---|---|---|---|
| 2004/0073362 A1* | 4/2004 | Fabian et al. | 701/210 |
| 2005/0164720 A1* | 7/2005 | Huang | 455/466 |
| 2006/0019634 A1* | 1/2006 | Hawkes | 455/411 |
| 2006/0148496 A1* | 7/2006 | Zhu et al. | 455/466 |

* cited by examiner

*Primary Examiner* — Charles Appiah
*Assistant Examiner* — Alexander Yi

(57) ABSTRACT

A user can select to automatically delete sent and received text messages from a phone, to avoid complications of another person having access to the phone reading stored messages.

14 Claims, 2 Drawing Sheets

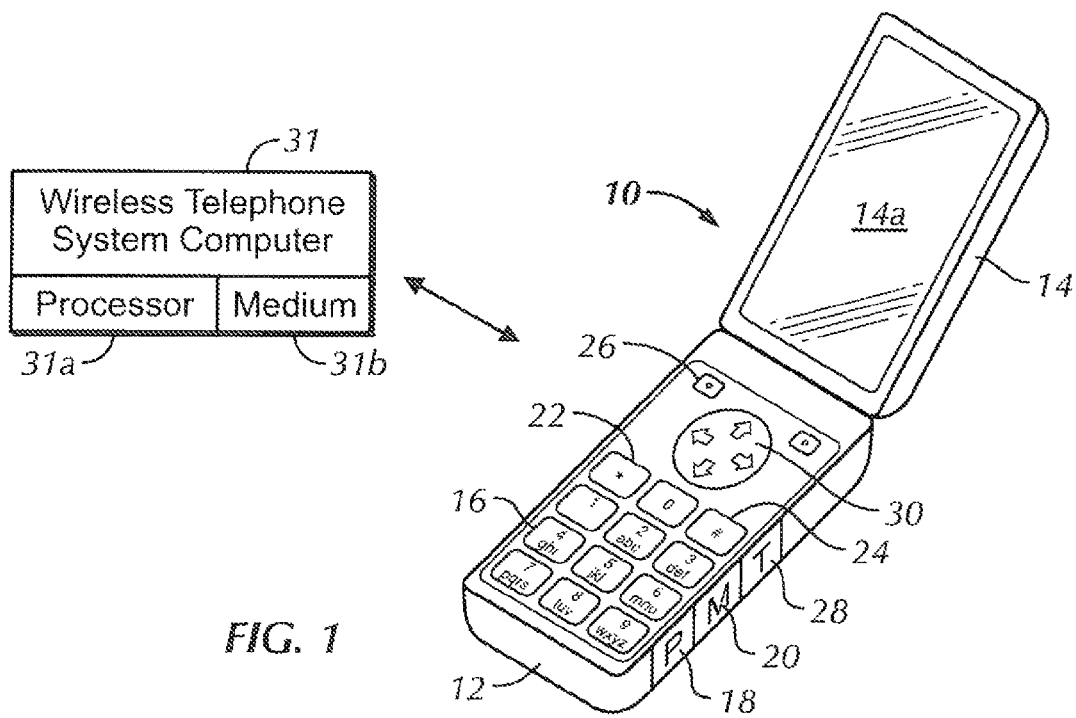
FIG. 1
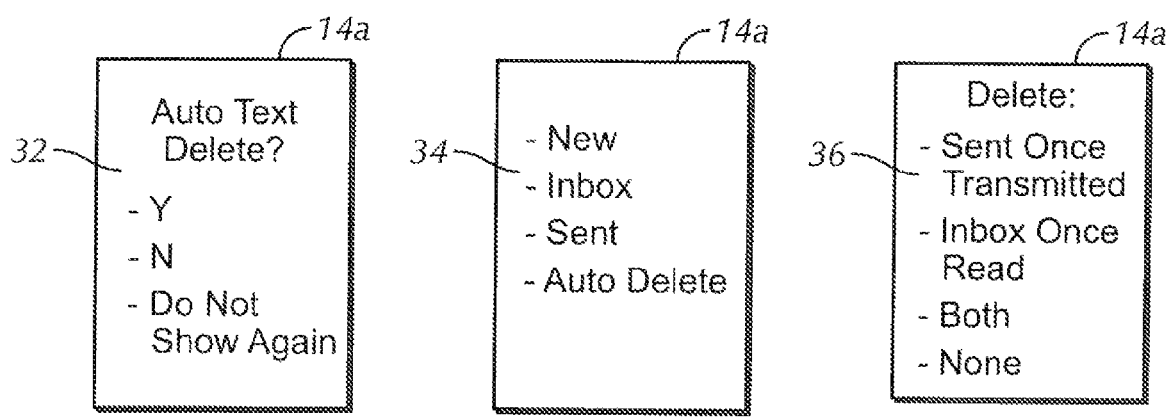
FIG. 2
FIG. 3
FIG. 4

TELEPHONE MESSAGING PRIVACY

FIELD OF THE INVENTION

The present application relates generally to telephone messaging privacy.

BACKGROUND OF THE INVENTION

Short message service (SMS) text messages can be sent from and received by many wireless telephones. A user manipulates the keys on the telephone key pad to send messages and received messages are presented on a small telephone display. As understood herein, telephones capture and store both sent and received messages. The messages can be deleted individually but unless one does so, another person can access those messages if the owner leaves the phone lying about. Which can be inconvenient, as it were.

SUMMARY OF THE INVENTION

Present principles facilitate a telephone-texting person to "avoid complications".

Accordingly, a wireless telephone includes a processor, a computer readable storage medium accessible by the processor and bearing instructions executable by the processor, and a wireless telephony transceiver accessible by the processor to send and receive text messages and voice messages. A display is controlled by the processor to present images thereon. Also, a keypad includes plural keys manipulable by a person to input signals to the processor. The processor accesses the medium to execute the instructions to present a user interface (UI) on the display bearing selector elements selectable by manipulation of one or more keys on the keypad prior to receipt of an incoming text message and/or prior to generation of an outgoing text message to input a desire to automatically delete sent text messages, and/or to automatically delete received text messages. The processor, responsive to a determination that the user has input a desire to automatically delete sent text messages, automatically deletes the outgoing text message following transmission thereof through the transceiver, and/or responsive to a determination that the user has input a desire to automatically delete received text messages, automatically deletes the incoming text message following viewing thereof on the display.

In example embodiments the UI bears first and second selector elements respectively selectable to input a desire to automatically delete sent text messages, and to automatically delete received text messages. The UI may also bear a selector element selectable to input a desire to automatically delete both sent text messages and received text messages, as well as a selector element selectable to input a desire to reset automatic deletion of text messages such that no messages are automatically deleted.

Responsive to a determination that the user has input a desire to automatically delete sent text messages, the outgoing text message can be automatically deleted from the medium following transmission thereof. Also, responsive to a determination that the user has not input a desire to automatically delete sent text messages, the outgoing text message is not automatically deleted from the medium following transmission thereof.

If desired, responsive to a determination that the user has input a desire to automatically delete received text messages, the incoming text message is automatically deleted from the medium following viewing of the message. Responsive to a determination that the user has not input a desire to automatically delete received text messages, the incoming text message may not be automatically deleted from the medium following viewing. In example embodiments the incoming text message is automatically deleted from the medium as soon as the user navigates away from a display showing the incoming text message.

In another aspect, a method includes determining whether user input indicating automatic text message deletion has been received at a wireless telephone, and automatically deleting a text message from a wireless telephone responsive to user input indicating automatic text message deletion being received before the text message is generated, to avoid complications of another person having access to the phone reading stored text messages.

In another aspect, a wireless telephone includes a processor, a computer readable storage medium accessible by the processor and bearing instructions executable by the processor, and a wireless telephony transceiver accessible by the processor to send and receive text messages and voice messages. A display is controlled by the processor to present images thereon. Also, a keypad includes plural keys manipulable by a person to input signals to the processor. The processor accesses the medium to execute the instructions to automatically delete sent and/or received text messages from a phone responsive to user input received prior to generation of the text messages being deleted, to avoid complications of another person having access to the phone reading stored messages.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic view of an example wireless telephone text messaging system;

FIGS. 2-4 are example screen shots for implementing present principles; and

DETAILED DESCRIPTION OF THE PREFERRED EMBODIMENT

Figure 5:
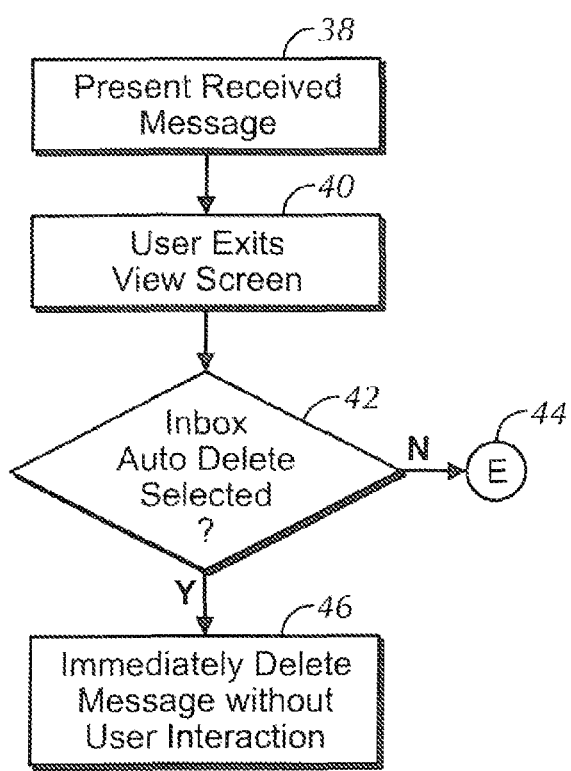
FIGS. 5 and 6 are flow charts of example logic.

Referring initially to FIG. 1, a wireless telephone 10 includes a keypad panel 12 hingedly connected to a display panel 14 bearing a visual display 14 that may instantiated by a liquid crystals display (LCD) or other matrix-type display or other type of display. In some embodiments the panels 12, 14 may be integrated as a single panel.

The keypad panel 12 bears plural number keys 16 that can be manipulated by a person to input number and letter signals to a processor 18 accessing a non-transitory computer readable storage medium 20 such as disk-based or solid state storage, removable in some implementations from the panel 12. The medium 20 can store sent and received text messages as well as instructions that are executable by the processor 18 for undertaking logic disclosed herein. The medium 20 can bear instructions to facilitate the sending and receiving of short message service (SMS) text messages. More than a single medium 20 may be used or combined.

As shown, in typical embodiments the number "2" key can be used to input the numeral "2" as well as the letters a-c by successively clicking the key until the desired letter appears on the display 14a for input. Similarly, the number "3" key can be used to input "3" and the letters d-f, "4" key to input "4" and the letters g-l, "5" key to input "5" and the letters j-l, "6" key to input "6" and the letters m-o, "7" key to input "7" and the letters p-s, "8" key to input "8" and the letters t-v, and "9" key to input "9" and the letters w-z. A "0" key can also be provided as shown to input the numeral "0". If desired, an asterisk key 22 may be provided to input an asterisk and a pound key 24 may be provided to input a pound sign.

Further, one or more control keys 26 can be borne by the keypad panel 12 to input to the processor 18 various signals the meanings of which may vary depending on the context of the user interface (UI) presented on the display 14a. The processor 18 can access a wireless telephony transceiver 28 to wirelessly send and receive voice and text signals to a wireless telephony network. Without limitation, the transceiver 28 may be a global systems for mobile communication (GSM) transceiver, a code division multiple access (CDMA) transceiver, variations and modifications, as well as other types of wireless telephony transceivers including, without limitation, TDMA, FDMA, SDMA, wideband-CDMA, orthogonal frequency division multiplexing (OFDM), etc.

Also, a rocker-type cursor movement key 30 may be provided that when pressed near it top moves a display 14a cursor up on the display 14a, when pressed near its bottom moves the cursor down, when pressed near its right moves the cursor right, and when pressed near its left moves the cursor left. Text messages sent to and received from the telephone 10 may be stored in a wireless telephony computer 31 having a computer processor 31a and computer data storage medium 31b.

FIG. 2 shows a UI 32 which may be presented on the display 14a when, for example, the user for the first time presses a control key 26. As shown, the UI 32 enables a user to select whether she wishes to invoke automatic text message deletion by selecting "yes" if she does and "no" if she does not. The user may also wish to select "do not show again" so that the next time the control key 26 is presented, the UI 32 will not be shown. Instead, the UI 34 shown in FIG. 3 is presented on the display 14a which allows a user to select to type in a new text message, to access her inbox of received text messages, or to access her sent box containing sent messages. Selection of "inbox" causes the latest received text message to be presented on the display 14a, and using the cursor movement key 30 the user can scroll through other stored messages in her inbox files. Likewise, selection of "sent" causes the latest sent text message to be presented on the display 14a, and using the cursor movement key 30 the user can scroll through other stored messages in her "sent" file. The message files typically are stored on the medium 20. Also, as a stored message is displayed, the user typically is given the option of manually deleting the message, and of manually deleting all messages in that file. However, absent present principles that is the only way for the user to delete her messages. The UI 34 may also include an "auto delete" selector element as shown to allow the user to invoke once again the UI 32 shown in FIG. 2 even if the user had selected "do not show again" from the UI 32 initially, i.e., the user can change her mind about auto deletion.

Upon selecting the "yes" selector in the UI 32 of FIG. 2 or the "auto delete" selector in the UI 34 of FIG. 3, a UI 36 in FIG. 4 is presented on the display 14a. As shown, the user is given the option of selecting to automatically delete from the medium 20 each outgoing message once sent, or to automatically delete each received message from the medium 20 after viewing once, or to select both. Also, in the event the user has selected auto delete but then changes her mind, she may select "none" as shown to reset the auto delete feature so that no messages are automatically deleted. The user's selections are recorded on, e.g., the medium 20.

It is to be understood that while particular terminology is shown in FIGS. 2-4 for the example selector elements, other terminology may be used without loss of generality or claim scope.

FIG. 5 shows that when the processor 18 receives through the transceiver 28 an incoming text message at block 38, it is presented on the display 14a either automatically and/or when the user selects "inbox". The processor 18 initially may generate an audible and/or visual alert to indicate reception of a text message.

Proceeding to block 40, responsive to determination that the user has exited the screen shot in which the incoming text message was displayed, the processor logic flows to decision diamond 42 to determine whether the user selected to automatically delete messages in her inbox. To do this, the processor 18 accesses the user's input from the UI 36 of FIG. 4 which have been stored on the medium 20. If the user had not selected to automatically delete receive messages the logic of FIG. 5 ends at state 44, but if the user had selected to automatically delete received messages from the UI 36 of FIG. 4 the message is automatically deleted from local storage at block 46 immediately and without further user interaction. Equivalent to deletion the message may be moved to a hidden file at block 46 but in any case no received message can be presented on the display 14a simply by invoking "inbox" from the UI 34 of FIG. 3.

Figure 6:
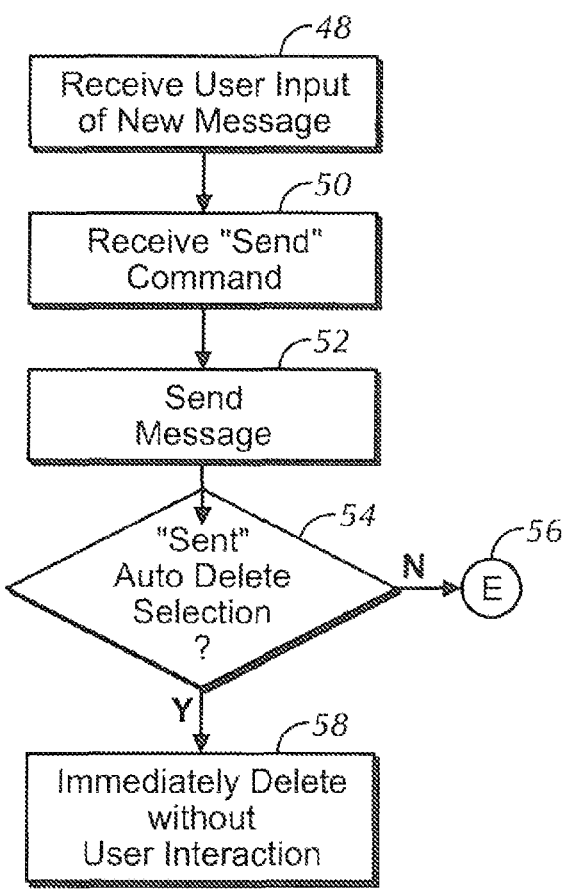

FIG. 6 shows example logic executed by the processor 18 for sending text messages. Commencing at block 48 the processor receives from the keys 16 user input of a new message, typically generated after the user selects "new" message from the UI 34 of FIG. 3. When she is satisfied with her message the user may manipulate, for example, a control key 26 to input a "send" signal to the processor 18 at block 50, which in response sends the message at block 52. If the processor determines at decision diamond 54 that user did not select auto deletion of sent messages from the UI 36 of FIG. 4, the logic of FIG. 6 ends at state 56. Otherwise, the processor immediately and without further user input deletes the sent message from memory 20 at block 58. Equivalent to deletion the message may be moved to a hidden file at block 58 but in any case no sent message can be presented on the display 14a simply by invoking "sent" from the UI 34 of FIG. 3.

In some embodiments, after automatically deleting sent and/or received messages the processor 18 may access the transceiver 28 to signal to the system computer 31 to also delete the message from any storage 31b of the system computer 31. The system computer 31 may obey the delete command or may elect to ignore it if, for instance, government regulations require the retention by telephone companies of text messages to track criminal or terrorist activity or even to keep tabs on common ordinary law-abiding citizens for their own good.

It may now be appreciated that present principles allow a user to select, a priori, to delete sent and received text messages from the phone 10. In other words, the user can, before a message is received, to automatically delete the received message from the inbox once the user is finished viewing it. Likewise, the user can, before an outgoing text message is sent, to automatically delete the sent message from the "sent" file once the message has been transmitted from the phone 10. That way, even if the user's nasty hideous boyfriend snatches her phone from her immediately upon completing reading or sending a text message, he will remain in the dark as to the content of the message.

While the particular TELEPHONE MESSAGING PRIVACY is herein shown and described in detail, it is to be understood that the subject matter which is encompassed by the present invention is limited only by the claims.

What is claimed is:

1. A wireless mobile telephone comprising: a processor; a computer readable storage medium accessible by the processor and bearing instructions executable by the processor; a wireless telephony transceiver accessible by the processor to send and receive text messages and voice messages; a display controlled by the processor to present images thereon; and a keypad including plural keys manipulable by a person to input signals to the processor, wherein the processor accesses the medium to execute the instructions to: present at least one user interface (UI) on the display bearing selector elements selectable by manipulation of one or more keys on the keypad to input a desire to automatically delete each and every received text message; responsive to a determination that the user has input a desire to automatically delete received text messages, automatically deleting each incoming text message that has been displayed in a message display mode, wherein each incoming text message is automatically deleted from the medium responsive to a determination that the user navigates away from a display showing the incoming text message.

2. The telephone of claim 1, wherein the UI bears first and second selector elements respectively selectable to input a desire to automatically delete sent text messages, and to automatically delete received text messages.

3. The telephone of claim 1, wherein the UI bears a selector element selectable to input a desire to automatically delete both sent text messages and received text messages.

4. The telephone of claim 1, wherein the UI bears a selector element selectable to input a desire to reset automatic deletion of text messages such that no messages are automatically deleted.

5. The telephone of claim 1, wherein responsive to a determination that the user has input a desire to automatically delete sent text messages, an outgoing text message is automatically deleted from the medium following transmission of the outgoing text message, and responsive to a determination that the user has not input a desire to automatically delete sent text messages, the outgoing text message is not automatically deleted from the medium following transmission of the outgoing text message.

6. The telephone of claim 1, wherein responsive to a determination that the user has input a desire to automatically delete received text messages, the incoming text message is automatically deleted from the medium following viewing of the incoming text message, and responsive to a determination that the user has not input a desire to automatically delete received text messages, the incoming text message is not automatically deleted from the medium following viewing of the incoming text message.

7. Method comprising: determining whether user input indicating automatic text message deletion has been received at a wireless mobile telephone capable of sending and receiving text messages and voice messages; and automatically deleting an incoming text message from a wireless mobile telephone responsive to user input indicating automatic text message deletion being received before the text message is generated, to avoid complications of another person having access to the phone reading stored text messages, wherein an incoming text message that has been displayed in a message display mode is automatically deleted from the medium responsive to a determination that the user navigates away from a display showing the incoming text message.

8. A wireless mobile telephone comprising: a processor; a computer readable storage medium accessible by the processor and bearing instructions executable by the processor; a wireless telephony transceiver accessible by the processor to send and receive text messages and voice messages; a display configured for being controlled by the processor to present images thereon; and a keypad including plural keys manipulable by a person to input signals to the processor, wherein the processor is configured for accessing the medium to execute the instructions to: automatically delete received text messages from a sending phone responsive to user input, to avoid complications of another person having access to the wireless mobile telephone reading stored messages, wherein each incoming text message that has been displayed in a message display mode is automatically deleted from the medium responsive to a determination that the user navigates away from a display showing the incoming text message.

9. The telephone of claim 8, wherein the processor:
presents at least one user interface (UI) on the display bearing selector elements selectable by manipulation of one or more keys on the keypad prior to receipt of an incoming text message and/or prior to generation of an outgoing text message to input a desire to automatically delete sent text messages, and/or to automatically delete received text messages;
responsive to a determination that the user has input a desire to automatically delete sent text messages, automatically deletes the outgoing text message following transmission thereof through the transceiver, and/or responsive to a determination that the user has input a desire to automatically delete received text messages, automatically deletes the incoming text message following viewing thereof on the display.

10. The telephone of claim 9, wherein the UI bears first and second selector elements respectively selectable to input a desire to automatically delete sent text messages, and to automatically delete received text messages.

11. The telephone of claim 9, wherein the UI bears a selector element selectable to input a desire to automatically delete both sent text messages and received text messages.

12. The telephone of claim 9, wherein the UI bears a selector element selectable to input a desire to reset automatic deletion of text messages such that no messages are automatically deleted.

13. The telephone of claim 9, wherein responsive to a determination that the user has input a desire to automatically delete sent text messages, the outgoing text message is automatically deleted from the medium following transmission of the outgoing text message, and responsive to a determination that the user has not input a desire to automatically delete sent text messages, the outgoing text message is not automatically deleted from the medium following transmission of the outgoing text message.

14. The telephone of claim 9, wherein responsive to a determination that the user has input a desire to automatically delete received text messages, the incoming text message is automatically deleted from the medium following viewing of the incoming text message, and responsive to a determination that the user has not input a desire to automatically delete received text messages, the incoming text message is not automatically deleted from the medium following viewing of the incoming text message.

* * * * *